United States Patent
Frick et al.

(10) Patent No.: US 6,292,252 B1
(45) Date of Patent: *Sep. 18, 2001

(54) APPARATUS FOR PRODUCING A PHOTOGRAPHIC PICTURE

(75) Inventors: Beat Frick, Buchs; Jürg Fenner, Dübendorf, both of (CH)

(73) Assignees: Gretag Imaging AG, Regensdorf; Gretag Imaging Trading AG, Wettingen, both of (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,383

(22) Filed: Sep. 8, 1999

(30) Foreign Application Priority Data

Sep. 8, 1998 (EP) ............................................. 98 1169 956
Feb. 17, 1999 (DE) ......................................... 299 02 750 U

(51) Int. Cl.[7] ........................... G03B 27/32; G03B 29/00; G03B 27/72; H01J 3/14; H04N 1/46
(52) U.S. Cl. ................................ 355/39; 355/29; 355/35; 355/41; 355/44; 355/67; 355/49; 250/216; 358/444; 358/501; 358/515
(58) Field of Search ................................ 355/35, 39, 29, 355/41, 44, 67, 49; 250/216; 358/444, 501, 515

(56) References Cited

U.S. PATENT DOCUMENTS

| | | |
|---|---|---|
| 4,516,032 | 5/1985 | Barr . |
| 4,692,812 | 9/1987 | Hirahara et al. . |
| 4,967,264 | 10/1990 | Parulski et al. . |
| 5,142,303 * | 8/1992 | Nelson ................................. 346/108 |
| 5,144,149 * | 9/1992 | Frosch .................................. 250/330 |
| 5,404,206 | 4/1995 | Andoh et al. . |
| 5,424,868 * | 6/1995 | Fielding et al. ...................... 359/634 |
| 5,546,128 * | 8/1996 | Nakagakiuchi et al. ............. 348/362 |
| 5,920,831 * | 7/1999 | Pringle et al. ....................... 348/650 |
| 5,926,253 * | 7/1999 | Uchiyama et al. ..................... 355/40 |
| 5,953,103 * | 9/1999 | Nakamura .............................. 355/32 |
| 6,081,321 * | 6/2000 | Mitagawa .............................. 355/71 |

FOREIGN PATENT DOCUMENTS 0 710 019 A2  5/1996  (EP) .

* cited by examiner

Primary Examiner—Russell Adams
Assistant Examiner—Khaled Brown
(74) Attorney, Agent, or Firm—Burns, Doane, Swecker & Mathis, LLP

(57) ABSTRACT

The invention relates to an apparatus for producing a photographic picture on a copy material, whereby an exposure arrangement with a projection optics is provided for the production of the photographic picture which includes a mirror matrix with individually movable mirrors, whereby the exposure arrangement includes a wide-band light source, for example a halogen light source, whereby a filter arrangement is positioned in the light beam between the light source and the mirror matrix in order to filter out or let pass specific spectral regions or specific amounts of light.

19 Claims, 4 Drawing Sheets

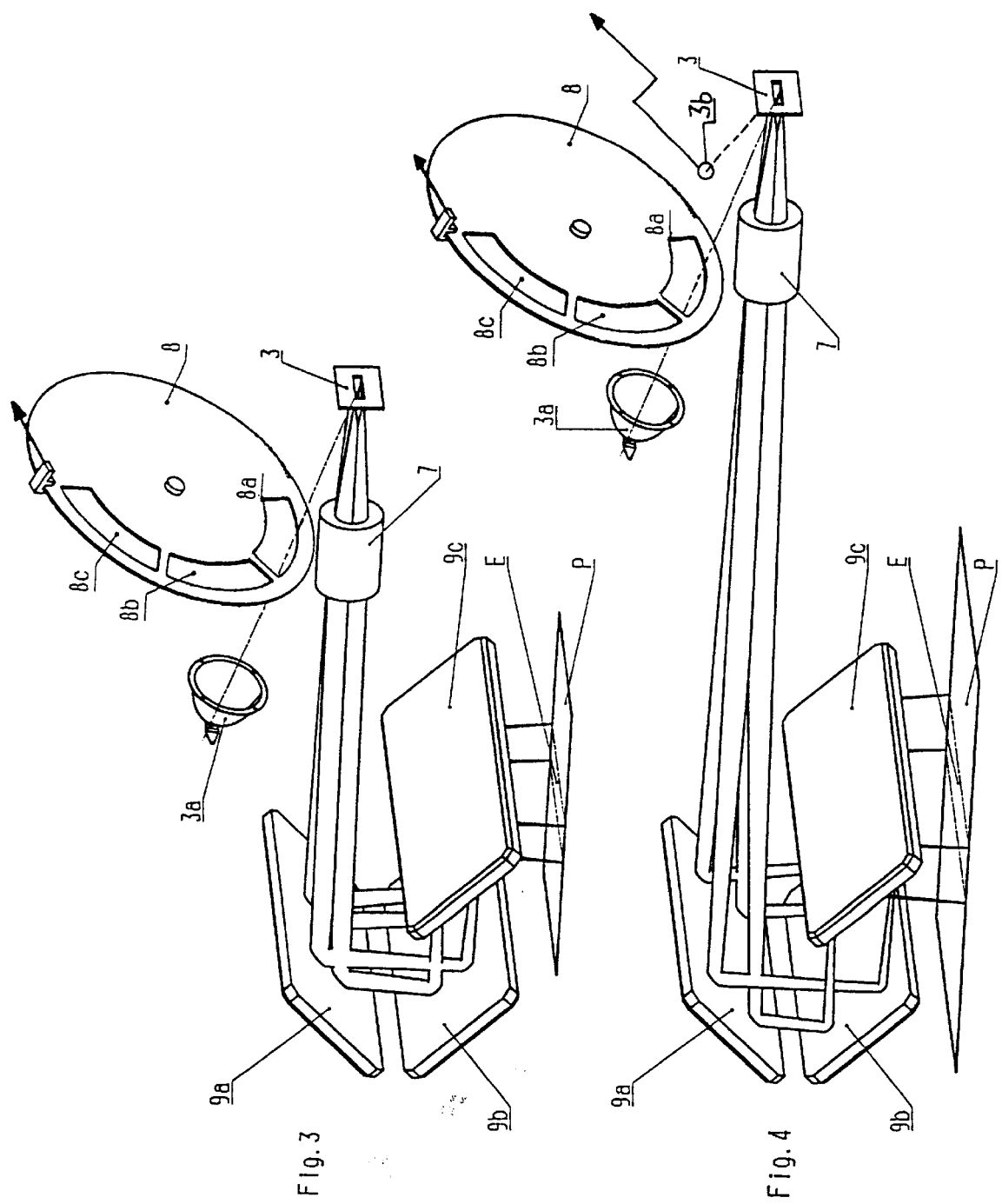

APPARATUS FOR PRODUCING A PHOTOGRAPHIC PICTURE

FIELD OF THE INVENTION

The invention relates to an apparatus for producing a photographic picture or print especially a copy of image data of an original present in the electronic form and preferable through strip-wise projection of the image information of the original onto a photographic copy material. The image data are thereby produced by way of a scanner arrangement and subsequently processed in an image data processing arrangement in order to be converted into the electronic form which is required for the exposure.

BACKGROUND ART

Digital picture producing apparatus on photographic basis, so-called digital photographic printers, produce paper copies or copies by projecting the image information of the underlying original present in an electronically stored format onto photographic copy material. For example, the image information of the original can be picture by picture optically reproduced for each image by way of a digitally operable mirror matrix. Accordingly, an optical representation of the original can be produced and this optical representation of the original projected onto the copy material and thereby exposed thereonto.

With line by line or strip-wise projection using the micro mirrors of the mirror matrix any size photographic pictures can be theoretically produced in the direction transverse to the lines or strips. Respectively strip shaped portions of the original which in the longitudinal direction cover the whole original can be optically produced one behind the other by way of the mirror matrix and sequentially exposed in corresponding spatial orientation onto the copy material. The correct spatial positioning of the exposed strips is thereby achieved by displacement of the copy material relative to the exposure light path. This can be achieved by advancement of the copy material or by correspondingly movable projection optics. The relative displacement takes place synchronously with the change of the reproduced strips of the original. If the strips are several lines wide, adjacent strips can possibly also overlap. If the copy material depending on the degree of overlap is in some regions multiply exposed, this must be correspondingly taken into consideration for the adjustment of the amount of copier light used in the individual exposure steps. This exposure process is known under the acronym TIG (Time Integration Gray Scale).

Relatively satisfactory photographic prints can be produced with the above described methods and the use of a conventional micro mirror matrix. The manufacturing costs for such arrangements for the manufacturing of a photographic picture are relatively high and the speed with which these photographic pictures can be produced is often less than desirable, especially when the light intensity per surface area is small during the exposure so that long exposure times are required.

SUMMARY OF THE INVENTION

It is an object of the present invention to provide an apparatus which addresses the above disadvantages of the prior art.

According to the invention an apparatus for producing a photographic picture on a copy material is provided with a scanner in order to scan an original for obtaining image data for the manufacture of photographic pictures. Furthermore, an image data processing arrangement is present which can be used for the processing of the image data to control signals for the manufacture of the photographic picture. An exposure arrangement with projection optics for producing the photographic picture is connected to the image data processing arrangement. The exposure arrangement includes a mirror matrix with individually controllable mirrors. The exposure arrangement includes a preferably wide-band light source, for example a halogen light source, and a filter arrangement is positioned in the light path between the light source and the mirror matrix in order to especially adjust specific light amounts for specific spectral ranges.

While in the prior art often very costly light sources are used in the corresponding arrangements, and the light which is projected by the mirror matrix with the micro mirrors onto the photo-sensitive copy material is filtered, it has been surprisingly found that high light densities or light intensities can be achieved by way of a conventional, preferably wide-band light source, for example a halogen light source. The exposure by way of the individual colours of the light spectrum which are required for an appropriate exposure of certain image elements, can be adjusted with a corresponding filter for different colours and a corresponding activation of the micro mirrors of the mirror matrix.

The filter arrangement, for example in the form of a filter wheel can be equipped over its total circumference with several filter regions for each base colour in order to avoid down times or to increase the speed of the arrangement.

A transport arrangement for a light sensitive material is provided for the manufacture of the photographic picture in the exposure arrangement, whereby the transport speed of the light sensitive copy material is detected or monitored with the use of a sensor. The sensor can be in the shape of an optical scanning arrangement, a mechanical pick-up arrangement or the like in order to detect the actual transport speed of the copy material on the transport arrangement. Preferably, the measured transport speed of the photographic picture is used for the speed control in the transport arrangement and/or the exposure time or exposure intensity by way of the mirrors or the light source. This means that based on the actual control speed with which the copy material is moved, either the transport speed is adjusted, for example with a step motor within a control loop, or the exposure time is adjusted with the mirrors of the mirror matrix. Of course, as above noted, the intensity of the light source can also be changed by an additional darkening or brightening arrangement, for example in the form of a LCD which is shone through, or the like. Of course, the mentioned measures can also be combined within a control loop and not only individually used.

In order to monitor the light intensity of the light source both integrally as well as spectrally, a measurement sensor, for example a photo cell can be provided which carries out a measurement integrally or for individual colours for the light which is not used for the projection onto the photosensitive copy material. The output of the light source can be adjusted in this manner or it can be determined when the light source must be changed either automatically or manually. For the automatic exchange but also for the manual exchange can be provided, for example, a carousel, a sled or the like which is activated when the variables detected by the measurement sensor lie outside the tolerance. Otherwise, for example upon a reduction in the light output, initially more current or a higher voltage can be fed to the light source through a control loop in order to extend the period of use of the light source, for example a halogen lamp.

The filter arrangement can be constructed as a filter wheel, as an additive or subtractive colour filter, and the like.

BRIEF DESCRIPTION OF THE DRAWINGS

Further embodiments with features according to the invention are further described in the following, whereby further features, advantages and objects according to the present invention are disclosed with reference to the attached illustrations, wherein:

FIGS. 3 and 4 show two schematic, perspective principle illustrations for illustration of an embodiment according to the invention which allows an adjustment for enlargement.

DETAILED DESCRIPTION OF THE PREFERRED EMBODIMENT

The embodiments discussed in the following are based on the premise that a picture, for example in the form of a negative, has been scanned in order to obtain image data therefrom which are present in an electronically stored format in order to re-project it onto a photo-sensitive copy material and thereby expose it thereonto. A conventional scanning arrangement can thereby be used in order to obtain the original for the extraction of the image data for the production of the photographic picture. The image data are subsequently processed in an image data processing arrangement (not illustrated) for the processing of the image data into control signals for the production of the photographic picture. The scanning and processing of the image data is sufficiently known in the prior art and does not need to be further explained herein. The processed image data can be subsequently stored in a memory in order to be subsequently processed with the apparatus with the features according to the invention. It is understood that the principle invention according to the present disclosure is in principle directed to the exposure arrangement and that the scanning arrangement and the image data processing arrangement are accordingly exchangeable at will. The exposure arrangement according to the invention can accordingly be connected to any adapted scanning arrangement or image data processing arrangement and can accordingly also be made in itself the subject of independent claims. The image information of the original which is composed of the total brightness and colour information for each individual image point of the original to be copied can be processed by the apparatus in accordance with the invention online or through a memory. Image information for the control can be recalled from the memory (not illustrated) pixel wise or separated according to colour portions.

The image information of a strip-shaped portion of the original is understood to represent the total brightness and colour information of original picture points which belong to the corresponding strip-shaped portion of the original.

Figure 1:
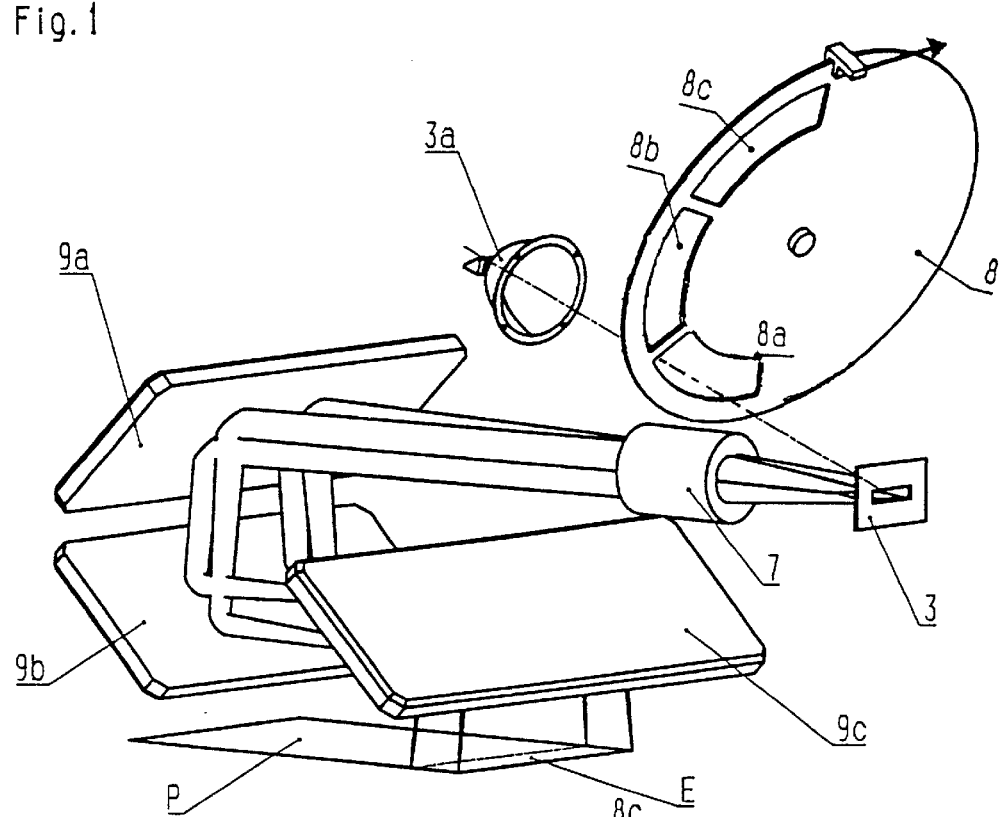
FIGS. 1 and 2 show two schematical sketches of a preferred embodiment according to the invention in a schematic, perspective illustration.

The principle of an exposure arrangement with features according to the invention is illustrated in FIG. 1. A light source 3a which preferably provides a continuous, wide-band light spectrum shines light through a filter arrangement 8, here a filter wheel with three filters 8a, 8b, 8c. The filter wheel can correspond in construction and operation to a conventional filter wheel which is sufficiently known and accordingly need not be further described herein. The different colour filters 8a, 8b, 8c can be of equal size or different size, depending on the light sensitivity characteristics of the copy material to be exposed. More than 3 colour filters can also be provided, for example, 6 or more, whereby respectively 2 have the same filter characteristics or colour filter characteristics in order not to cause down times as occur with the filter wheel 8 according to FIG. 1.

The spectral range of the light spectrum which was selected by way of the filters 8a, 8b, 8c of the filter wheel 8 impinges on a mirror matrix 3 with individually movable or group-wise movable mirrors which is also known under the designation, "digital micro mirror field" or "DMD" (digital micro mirror device).

The light reflected by the mirror matrix or the digital micro mirror field by movement of individual or several groups of mirrors is projected by way of a lens 7, onto an arrangement of deflecting mirrors 9a, 9b, 9c by which the projection onto a light sensitive copy material P takes place. A strip-wise exposure on the light sensitive copy material P takes place, whereby the deflecting mirror 9c is moved across the copy material P according to the image information to be represented. Of course, in the alternative, the copy material P can be moved, while the mirror arrangement is maintained stationary. In both cases, an exposure strip E is moved across the copy material P.

As already mentioned, the movability of the projection optics or the relative movement of the exposure strip E relative to the copy material P is achieved by way of the three mirrors 9a, 9b and 9c inserted into the light path between the lens 7 and the copy material P. They are displaced parallel to the plane of the copy material P in a direction perpendicular to the longitudinal direction of the exposure strip E by way of suited drive means, for example, step motors. The two deflecting mirrors 9a and 9b are stationary relative to one another and are positioned at a right angle to one another so that they deflect the light path by 180°. The deflecting mirror 9c is positioned parallel to the deflecting mirror 9b and deflects the light path by 90° onto the copy material. The deflecting mirror 9c moves in the same direction as deflecting mirrors 9a and 9b, however with twice the speed of the deflecting mirrors 9a and 9b so that the optical picture length between the lens 7 and the copy material P remains constant independent of the position of the deflecting mirrors. Through this movement of the deflecting mirrors, the strip shaped exposure region E is moved across the copy material as is clearly apparent from FIG. 1, when viewed in combination with FIG. 2.

The required relative movement can also be carried out by a corresponding adjustment of the whole projection optics including the digital micro mirror field.

Figure 2:
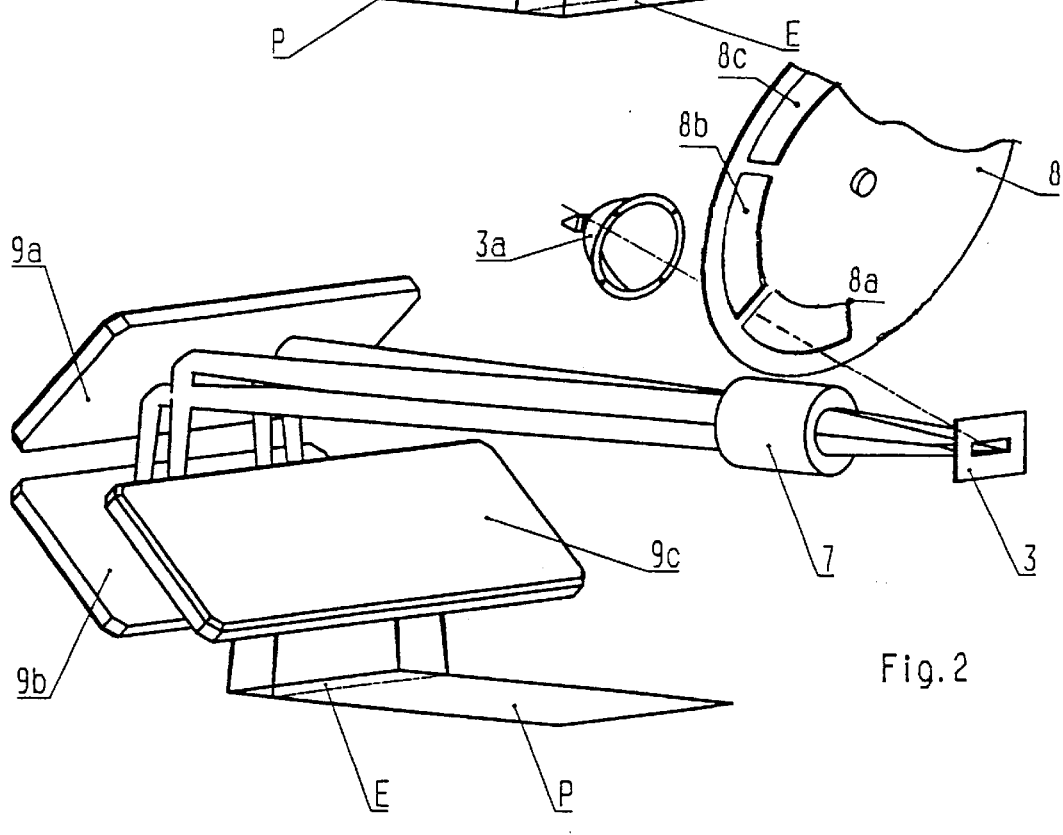

FIGS. 3 and 4 also show how the enlargement of the projection system can be adjusted with a moveable projection optics according to FIGS. 1 and 2. As is apparent, the distance between the lens 7 and the digital micro mirror field 3 can be changed or the optical picture length between the lens 7 and the copy material P. FIGS. 3 and 4 show the deflecting mirrors and the lens at two different adjustments of an enlargement scale. The enlargement can also be changed in another manner, for example, by changing the distance between the deflecting mirror 9c and the copy material P and correspondingly adjusting the lens.

FIG. 4 shows in addition that a sensor, for example in the form of a photocell 3b can be provided to detect and analyse the light reflected by the digital micro mirror field and not directed to the lens 7. This light or the measured values obtained therefrom by way of the sensor 3b can be used for the testing of the light source, especially a halogen lamp 3a. By way of these measured data which can be detected both integrally and spectrally divided, the light quality of the lamp 3a can be determined. It is also possible to thereby determine a point in time when the light source or lamp 3a must be exchanged. This, for example, can be the case when the light of the light source 3 losses intensity and certain colour regions of the spectrum. Otherwise, the light source can be controlled by way of the obtained measured data through a changed current or voltage supply in order to maintain the light quality and thereby the quality of the photographic pictures to be produced. The arrow originating from the sensor 3b indicates measurement conductors which can lead to an analysis electronics. Correspondingly, a measurement point for measured data can be provided at the upper end of the filter wheel 8 through which the position of the filter wheel 8 or its filter or colour filters 8a,8b, 8c relative to the light path between the lamp 3a and digital micro mirror field 3 is recognised.

Figure 5:
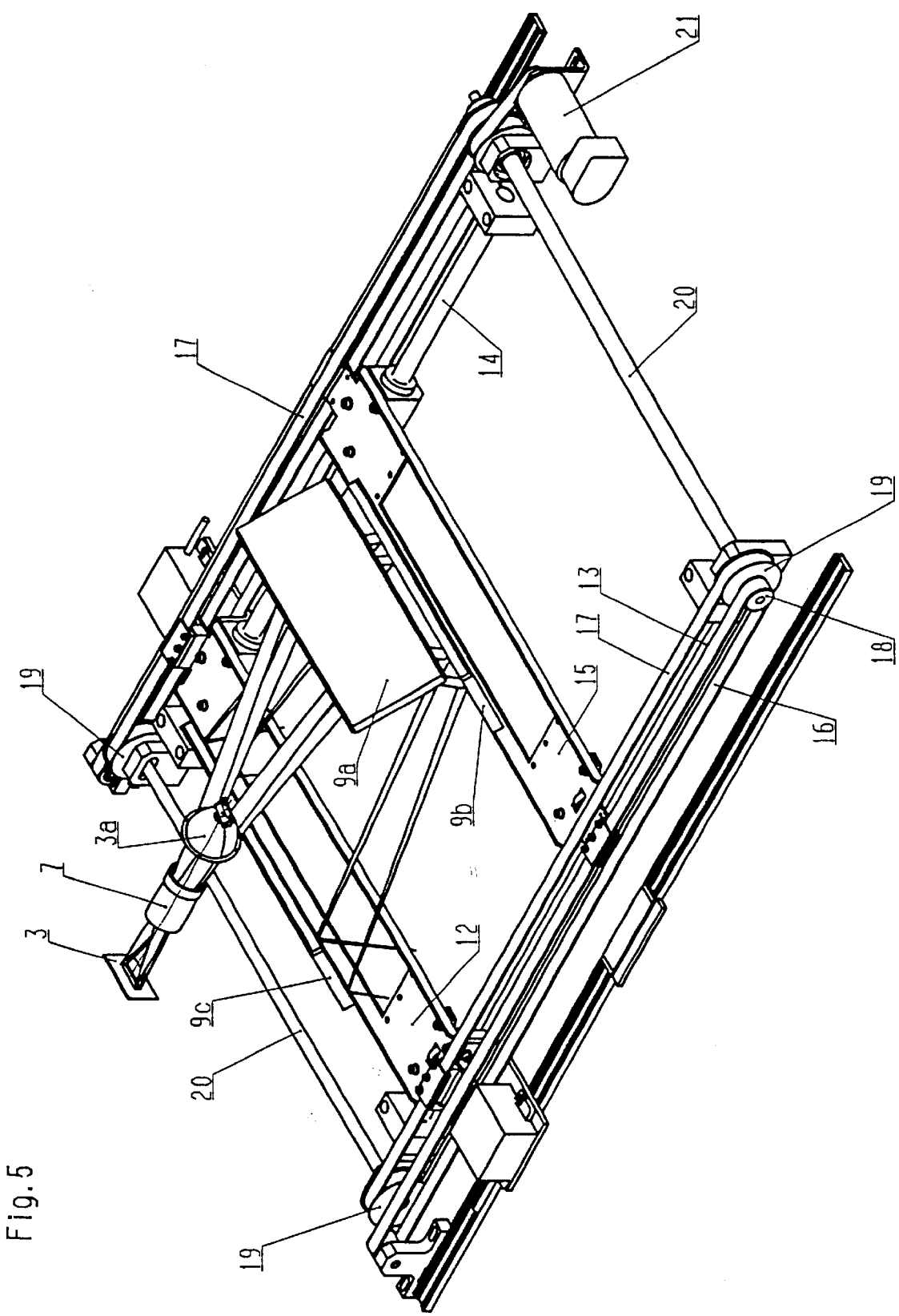
FIG. 5 is a partial view of an embodiment with features according to the invention whereby a filter arrangement is omitted for reasons of clarity.

FIG. 5 shows how a projection arrangement according to FIGS. 1 and 2 can be practically accomplished. Two guide rods 13 and 14 are mounted in a device frame (not illustrated), on which two mirror sleds 12 and 15 are moveably positioned and parallel to each other. A deflecting mirror 9c is mounted on the mirror sled 12 and the two deflecting mirrors 9a and 9b are mounted on the mirror sled 15. To both sides of both mirror sleds 12 and 15 two transport belts 16 or 17 are respectively tensioned between respectively two pulley pairs 18 or 19. The pulley pairs 18 and 19 sit on common drive shafts and are synchronously driven by a drive motor 21 controlled by the here not illustrated control 2. The pulleys 18 associated with the transport belt 16 have exactly half the diameter of the pulleys 19 associated with the transport belt 17. The first mirror sled 12 is fastened to the transport belt 17, the second mirrors sled 15 on the transport belt 16. The deflecting mirrors 9c or 9a and 9b respectively mounted on the mirrors 12 and 15 can thus be adjusted parallel to the guide rods 13 and 14 by way of the drive motor 21, whereby the deflecting mirror 9c necessarily always travels with twice the speed of the two deflecting mirrors 9a and 9b.

It is of course possible within the framework of the invention to divide these strip shaped portions a of the original into two or more sections, whereby then correspondingly several lenses are provided for the projection and the remaining components must be correspondingly adapted.

In the only verbally described examples, the partial exposure regions are respectively directly the adjacent. In order to make the whole arrangement less susceptible to adjustment errors, it is advantageous to somewhat overlap the partial exposure regions (and the underlying sections of the original), for example, by about 1 to 50 pixel. Because of the thereby resulting double exposure in the overlapping region, a corresponding correction (redirection of the brightness) of the representations of the sections of the original produced by the converter device as required in the overlapping regions. For example, the brightness of the picture points in the overlapping regions can be linearly reduced to zero from inside out.

Principally any pixel-wise operating, active or passive type of converter device can be used as the electro-optical converter device 3. Examples therefore are, as already mentioned, cathode ray tubes, light emitting diode fields, electro-luminescence fields or liquid crystal fields. Especially advantageous are however so-called digital micro mirror fields (DMD=Digital Mirror Device), as they are used, for example, also in large picture projection apparatus. A typical micro mirror field used for the purposes of the invention includes on one chip an arrangement of 1,280 by 1,024 mirrors, which can be moved between two defined angulation positions by electric control. For the purpose of the present invention, only a strip-shaped region of the micro mirror field, including, for example, only 1,280 by 300 individual mirrors, is used.

Such micro mirror fields are naturally operated in reflection and are thus passive. They are in the practical use positioned in front of the pupil of a projecting lens that the micro mirrors direct the light impinging thereon in one angular orientation into the projection lens and in the other angular orientation past the pupil of the projecting lens. The intensity modulation of the reflected light is thereby carried out by intermittent control of the micro mirrors at a corresponding control frequency. The construction, control techniques and possible applications of such digital micro mirror fields are described in detail in the pertinent publications of the manufacturers, for example, the company Texas Instruments, Houston, Tex., U.S.A., and are not subject of the present invention.

Figure 7:
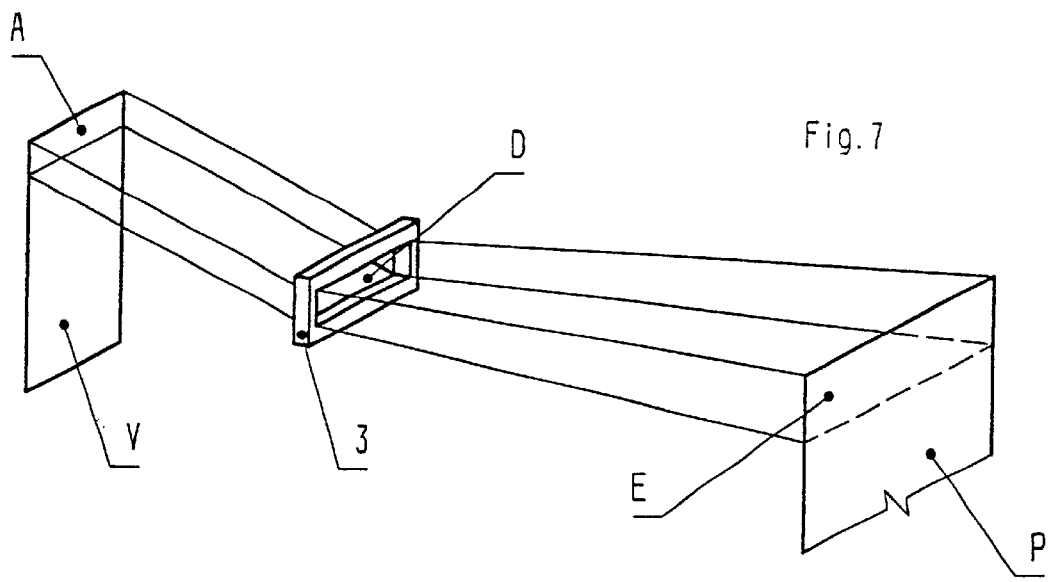
FIGS. 6 to 8 show the schematic illustrations which discuss a possible operation of the apparatus in accordance with the invention.
Figure 6:
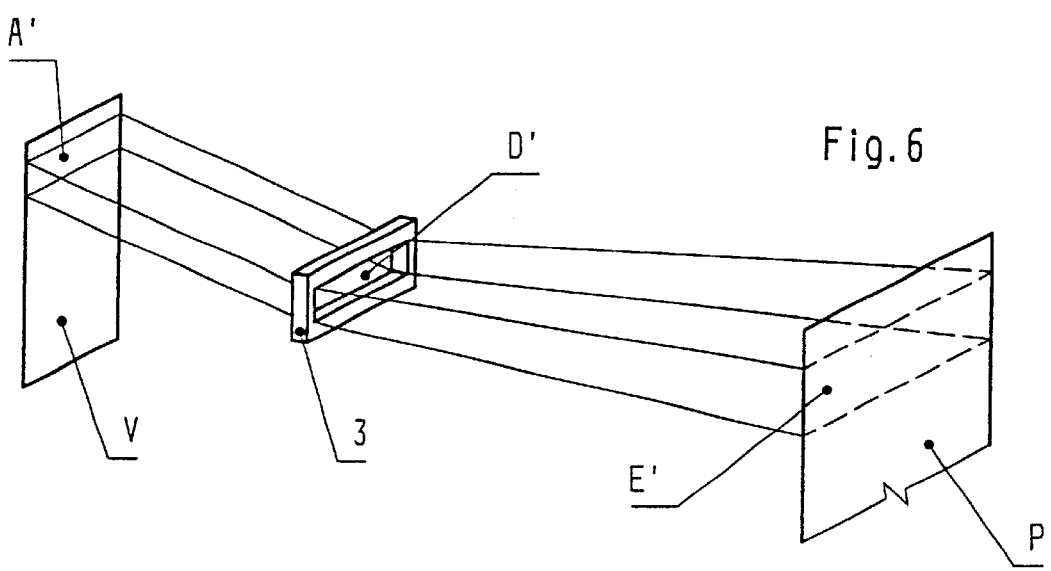
Figure 8:
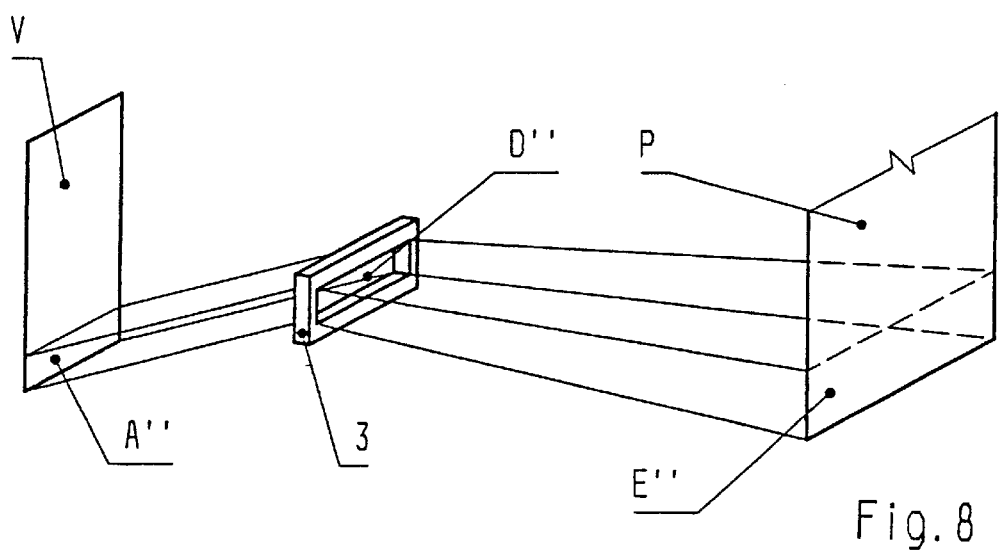

FIGS. 6 to 8 illustrate the principle of the line by line or strip-wise projection. The original represented by the totality of all stored brightness and colour information for each individual one of its picture points is designated by V. The here not illustrated control to 2 reads out the image information of the first strip-shape portion A of the original V and controls there with a pixel-wise operating electro-optical converter device 3, which produces a pictorial optical representation D of the strip-shaped portion A by way of the signals fed thereto. The electro-optical converter device 3 can be formed, for example, by a light emitting diode field, for example, 1,280 by 300 individual diodes, or preferable, as further discussed below, by a digital micro mirror field with a corresponding or a larger number of individual mirrors. The optical representation D—also a stripped shaped—of the stripped-shaped portion A of the original V produced by the electro-optical converter device 3 is now projected by way of here not illustrated projection optics into a (in this example stationary) strip-shaped exposure region 3 onto a photographic copy material P and thereby exposed thereonto (FIG. 7). Subsequently, a further strip-shaped portion A' is read out, an optical representation D' is produced therefrom and exposed onto the copy material P which has been advanced by a corresponding distance relative to the exposure region E (FIG. 6). The whole process is now repeated until the whole original is captured and the last strip-shaped portion a A" of the original is read out, an optical representation D" is produced therefrom and the latter is exposed onto the copy material P (FIG. 8).

As is apparent, the strip-shaped portions A of the original are now positioned side by side overlapped to a large degree (transverse to their longitudinal direction) this leads to an overlap also of the strips exposed onto the copy material P so that the copy material P is also multiply exposed, depending on the degree of overlap. This multiple exposure is accounted for in that the brightness values of the individual image points of the optical representations D of the portion A are correspondingly reduced (possibly colour selective) by the control 2 so that the sum of the amounts of copy light impinging on the copy material in the respective image points is again correct. This exposure method is generally known under the acronym TIG (Time Integration Gray Scale).

Up to this point, this process of line by line stripwise projection corresponds to the prior art and does not require any further explanation.

As is apparent, the length of the strip-shaped portions A which cover the whole width of the original correspond in length (the usable surface) to the electro-optical converter device 3. The resolution in longitudinal direction of the strip is thereby set by the number of the individual pixels of the converter device 3 in longitudinal direction. However, the resolution at larger enlargement scales (pictures of large format) which is achievable with today's commercially available converter devices (maximum pixel number in longitudinal direction about 1,280) is in many cases quantitatively not sufficient. This is where the invention starts.

The strip-shaped portions of the original can also be divided into two or more sections positioned one behind the other in longitudinal direction and a separate representation can be produced from each section by way of the electro-optical converter device which fills the whole length of the converter device. These separate representations are exposed onto the copy material by way of a specially constructed projection optics and in a correct location in partial exposure strips which are located in longitudinal direction one behind the other so that the exposed partial exposure strips together again include the image information of the strip-shaped portion of the original consisting of the sections. By this division of the strip-shaped portions of the original into two or more sections, a double or multiple of the pixel number in longitudinal direction of the converter device is available for each strip-shaped portion of the original so that a sufficiently high resolution and thereby high picture quality is achievable even with very large format copies (typically up to a format of 12 inches by 18 inches).

An also useable process can be described by way of an example wherein each strip-shaped portion A of the original B is divided into two sections. An optical representation can be produced from one section by way of the electro-optical converter device 3 and that representation exposed in a partial exposure region onto the copy material P. For the other section, a corresponding further optical representation and a further partial exposure region can be used. The production of the two representations and the exposure thereof onto the copy material is done sequently.

A somewhat wider electro-optical converter device can also be used so that by way of the same converter arrangement two strip-shaped sections off the original can be produced simultaneously and locally parallel by using different pixel regions. An upper representation can be produced from one strip-shaped section of the original V and a lower representation can be produced from the other section. Both of these representations are exposed simultaneously and in two strip-shaped partial exposure regions positioned one behind the other and in correct location onto the copy material P by way of a projection optics especially constructed for this purpose.

What is claimed is:

1. An apparatus for producing a photographic picture on a copy material, comprising:
   a) a scanning device for scanning a photographic original to obtain image data;
   b) an image data processing arrangement for processing the image data to produce control signals;
   c) an exposure arrangement for exposing a region of a light sensitive copy material for an exposure time and at an exposure intensity, said exposure arrangement including:
      a mirror matrix having a plurality of individually movable mirrors;
      a projection optics;
      a wide-band light source; and
      a filter arrangement positioned in a light path between the light source and the mirror matrix for filtering specific spectral regions of the light spectrum; and
   d) a transporting arrangement for transporting the copy material at a transport speed, wherein the transport speed is detected by a sensor and wherein at least one of the exposure time and exposure intensity are controlled based on the detected transport speed.

2. The apparatus according to claim 1, wherein the mirror matrix controls the exposure time based on the detected transport speed.

3. The apparatus according to claim 1, further comprising a measuring sensor for detecting light from the light source.

4. The apparatus according to claim 1, wherein the filter arrangement is a filter wheel having a plurality of individually moveable color filters.

5. The apparatus according to claim 1, wherein the projection optics comprises at least one moveable component, the at least one moveable component operable to move the exposure region across the copy material.

6. The apparatus according to claim 5, wherein the at least one moveable component comprises three deflecting mirrors, said mirrors being linearly movably driven parallel to the copy material and perpendicular to a longitudinal direction of the exposure region.

7. The apparatus of claim 1, wherein said light source is a halogen light source.

8. The apparatus of claim 1, wherein said filtering arrangement is for filtering specific intensities of light.

9. The apparatus of claim 1, wherein the transport speed of the light sensitive copy material is monitored by a sensor.

10. The apparatus of claim 1, wherein the mirror matrix adjusts the exposure intensity based on the detected transport speed.

11. The apparatus of claim 1, wherein the light source controls the exposure time based on the detected transport speed.

12. The apparatus of claim 1, wherein the light source controls the exposure intensity based on the detected transport speed.

13. The apparatus of claim 3, wherein said measuring sensor facilitates the control of the light source.

14. The apparatus according to claim 1, wherein the filter arrangement is an additive filter arrangement having a plurality of individually moveable color filters.

15. The apparatus according to claim 1, wherein the filter arrangement is a subtractive filter arrangement having a plurality of individually moveable color filters.

16. The apparatus of claim 6, wherein a first and a second of said deflecting mirrors are positioned in a fixed mutual spatial orientation and deflect the projection light beam by 180°.

17. The apparatus of claim 16, wherein a third of said deflecting mirrors is positioned anti-parallel to the second deflecting mirror and deflects the light beam perpendicularly onto the copy material.

18. The apparatus of claim 17, further comprising a drive means for moving the third deflecting mirror with twice the speed of the first and the second deflecting mirrors.

19. A system for producing a photographic picture on a copy material, comprising:
   a scanning device for scanning a photographic original to obtain image data;

an image data processing arrangement for processing the image data to produce control signals;

a mirror matrix for receiving the produced control signals and having a plurality of individually movable mirrors;

a wide-band light source;

a filter arrangement positioned in a light path between the light source and the mirror matrix for filtering specific spectral regions of the light spectrum, wherein the mirror matrix, the light source, and the filter arrangement are operable to create an exposure region on the copy material; and a projection optics comprising at least one moveable component, the at least one moveable component operable to move in a plane parallel to the copy material to scan the exposure region across the copy material.

* * * * *